No. 717,315. Patented Dec. 30, 1902.
F. C. AVERY.
HANDLE ATTACHMENT FOR DUST PANS.
(Application filed Jan. 13, 1902.)

(No Model.)

Witnesses,
Mabelle Blanche.
F. H. Avery.

Inventor,
Frederick C. Avery.

UNITED STATES PATENT OFFICE.

FREDERICK C. AVERY, OF CHICAGO, ILLINOIS.

HANDLE ATTACHMENT FOR DUST-PANS.

SPECIFICATION forming part of Letters Patent No. 717,315, dated December 30, 1902.

Application filed January 13, 1902. Serial No. 89,583. (No model.)

*To all whom it may concern:*

Be it known that I, FREDERICK C. AVERY, a citizen of the United States, residing at No. 6363 Greenwood avenue, Chicago, county of Cook, State of Illinois, have invented a new and useful Article of Manufacture, of which the following is a specification.

The object of my invention is to produce a supplemental holder for the common type of dust-pan that will allow the user to stand in an upright position, and also an article that can be manufactured and sold independent of the dust-pan and is in no way a part of it, yet it can be attached to the pan by any person who wishes an article of this kind. This attachment is made in such a way that it can be quickly attached or detached and with a range that will allow it to be fastened to any size of dust-pan in use.

The attachment is composed of a handle of suitable length, a wire frame A, two clamps B, and a bolt and nut C D, as shown in the accompanying drawings, in which—

Figure 1:
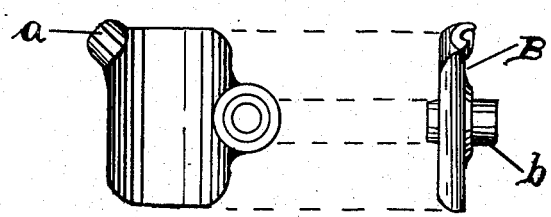
Figure 2:
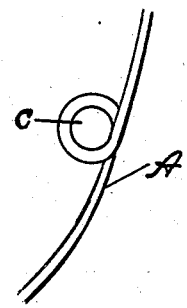
Figure 3:
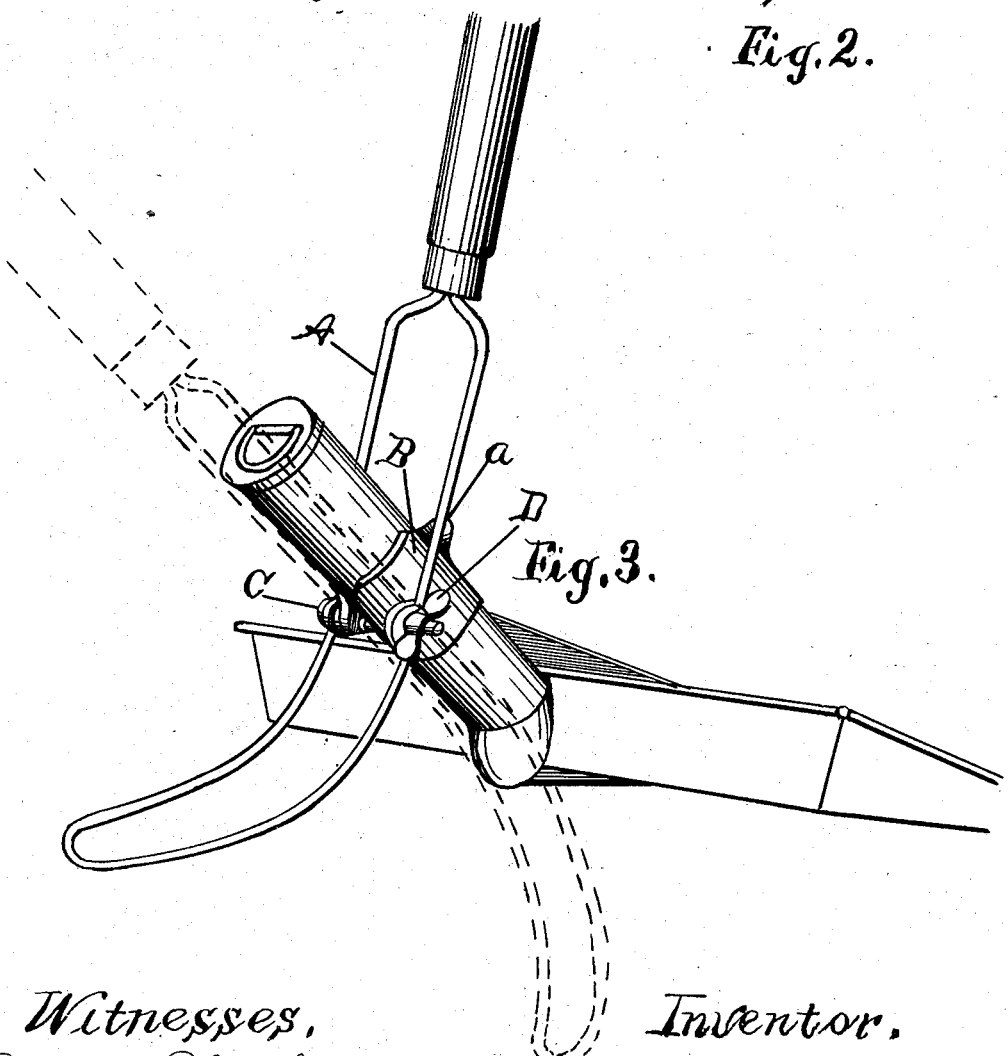

Figure 1 is a drawing of the clamp B, showing the notched portion $a$ and the trunnion $b$. Fig. 2 is a portion of the wire frame A, showing the loop $c$. Fig. 3 is a view of the attachment in place on a dust-pan when in use, with dotted lines to show the position of the handle when the pan is hung up or laid away.

It will be noticed that the clamps B, which are held in place by the bolt C D, have a notched portion $a$, which engages with the wire frame A. This wire frame A locks and unlocks from the notched portion $a$ by depending on the springing action of the wire frame A and may be forced in and out of place as desired. The loop $c$ of the wire frame A is arranged to swing on the trunnions $b$ of the clamps B. The trunnions $b$ are made long enough to allow the bolt to draw the clamps B in place, and yet will not interfere with the swinging movement of the frame A.

The lower curved portion of the frame A acts as a rest when the pan is on the floor and may be used to steady the pan with the foot while in use.

It is plain to see that this device may be attached to the handle of any dust-pan and may be adjusted in place by sliding up or down the handle of the pan and then locked in position with the bolt, as shown.

Having thus fully described my invention, what I claim, and desire to secure by Letters Patent, is—

1. A supplemental holder for dust-pans, consisting of suitable handle, and a wire frame, having a rearwardly-extending portion, and a clamp pivoted in suitable bearings about centrally of the said wire frame, all substantially set forth as shown.

2. In a supplemental holder for dust-pans, the combination of a suitable handle, and a wire frame portion mounted on said handle, and a suitable clamp pivoted to said wire portion and all substantially as shown and described.

3. In a supplemental holder for dust-pans, the combination with a suitable handle and wire frame portion of a clamp composed of two convex plates, pivoted to said frame portion and a clamp-screw, all substantially as shown.

4. In a supplemental holder for dust-pans, the combination with a suitable handle of a wire frame portion and a clamp consisting of two plates pivoted thereto, each plate being provided with suitable notches for the reception of the members of the wire frame portion, all substantially as shown and described.

FREDERICK C. AVERY.

Witnesses:
MABELLE BLANCHE,
F. H. AVERY.